United States Patent [19]

Speisser

[11] Patent Number: 4,934,063
[45] Date of Patent: Jun. 19, 1990

[54] ARRANGEMENT FOR THE DIAGNOSIS OF THE DIMENSIONS OF A MOTOR VEHICLE CHASSIS

[75] Inventor: Alfred Speisser, Kehl-Sundheim, Fed. Rep. of Germany

[73] Assignee: Celette GmbH, Fed. Rep. of Germany

[21] Appl. No.: 398,233

[22] Filed: Aug. 24, 1989

[30] Foreign Application Priority Data

Aug. 25, 1988 [DE] Fed. Rep. of Germany ....... 3828838

[51] Int. Cl.$^5$ ..................... G01C 15/12; G01B 11/20
[52] U.S. Cl. ......................................... 33/608; 33/288; 33/545; 33/645
[58] Field of Search .............. 33/608, 645, 552, 573, 33/288, 545

[56] References Cited

U.S. PATENT DOCUMENTS

| | | | |
|---|---|---|---|
| 4,242,803 | 1/1981 | Dory | 33/608 X |
| 4,781,045 | 11/1988 | Celette | 33/288 X |
| 4,811,250 | 3/1989 | Steber et al. | 33/288 X |

Primary Examiner—Harry N. Haroian
Attorney, Agent, or Firm—Wall and Roehrig

[57] ABSTRACT

The invention relates to apparatus for the diagnosis of the dimensioins of a motor vehicle body positioned on an alignment bench comprising a frame constructed of sections on which are arranged terminal alignment-angle sets. These sets are comprised of mechanical parts including end or head pieces which are disposed on columns longitudinally displaceable and fixable in guide supports fastened appropriately on the frame to function as multi-Z-receptors. The configuration of the end or head pieces are fabricated such that upon positioning on the column they will have already in them the desired or predetermined XYZ-values or dimensional coordinates of the points of the motor vehicle to be checked when in either a complete or partially disassembled state. The arrangement is characterized in that at each end or head piece of the terminal receptors (3) electrical contacts (4) or electronic sensors are provided which when the portion of the motor vehicle being checked is in place on the bench a Yes/No signal is triggered depending on whether or not the individual point of the motor vehicle to be checked corresponds to the correct XYZ-value or dimensional coordinate and the result is evaluated or displayed by an evaluation and/or display arrangement (6).

6 Claims, 2 Drawing Sheets

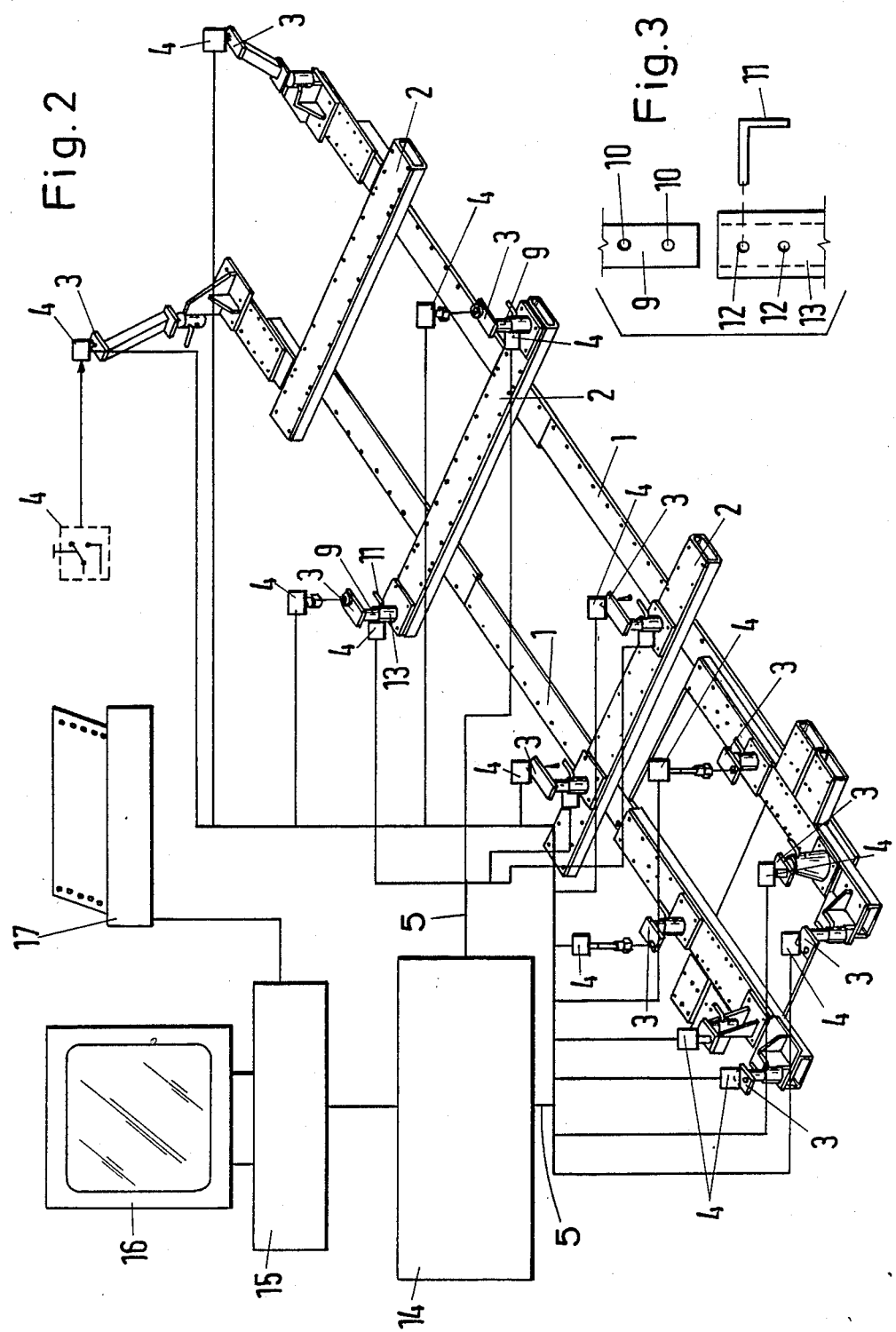

ARRANGEMENT FOR THE DIAGNOSIS OF THE DIMENSIONS OF A MOTOR VEHICLE CHASSIS

BACKGROUND OF THE INVENTION

The invention relates to an apparatus for the diagnosis of the dimensions of a motor vehicle body positioned upon an alignment bench. The alignment bench comprises a frame constructed of sections upon which can be arranged vehicle position alignment-angle verification sets comprised of mechanical parts, which are carried on columns longitudinally displaceable and fixable in guide supports fastened appropriately on the frame. The alignment-angle verification sets function as multi-Z-receptors to locate the XYZ dimensional co-ordinates of a predetermined position, relative to the bench, whereby the terminal end pieces, or head pieces, which through fabrication are constructed such that they define the desired XYZ-co-ordinate values of the points of the vehicle to be checked, or verified, are correctly positioned relative to a vehicle positioned on the alignment bench.

Arrangements for aligning and repairing of damaged bodies of motor vehicles have become known in which an alignment bench, comprising a frame constructed of sections with holes provided on the top side, has fastened thereto from the front to the back, by means of screws, several vehicle position verification sets spaced at a distance of a modular dimension. Such an arrangement is described, for example in DE-GM 87 08 639.5. where on a frame of the previously stated type the individual elements of an alignment-angle set are arranged which, for example, extend from the front covering and the fastening of the front bumpers to the fastening of the rear shock absorber and the rear bumpers. Such a system is also disclosed in U.S. Pat. No. 4,781,045, the disclosure of which is hereby incorporated by reference.

Such an arrangement has been used for the most varied types of motor vehicles, or their bodies, wherein the individual parts of the vehicle position-location-verification, sets are comprised of mechanical parts or heads which are carried on columns which are longitudinally displaceable and fixable on the frame. The sets are formed by connecting the heads to the columns by means of plug pins positioned in guide supports and the sets fastened on the frame. Such an arrangement is referred to in general as "multi-Z-receptor" where the plug pin is passed into an alignment bore formed in the heads and columns for checking the position of a predetermined point on the vehicle in the three dimensional X, Y and Z planes.

SUMMARY OF THE INVENTION

The present invention is based on the task of improving the previously known arrangement in the manner that a rapid and reliable diagnosis of the dimensions of a motor vehicle body is possible, wherein the issue is not a precise measuring of the body but rather only the question "does each actual or existing XYZ-co-ordinate value or dimensions of the point of the vehicle to be checked correspond to the normal co-ordinate dimensional value or not?". In a damaged body, depending on the degree of damage, the actual or existing XYZ-co-ordinate values on, for example the underside of the body, may deviate more or less from the normal co-ordinate values of an undamaged body. Here, through the invention, a "Yes/No" determination is made as rapidly and reliably as possible with respect to whether or not the above stated dimensional co-ordinates correspond to the positional co-ordinates of an undamaged body.

To solve the posed task, an arrangement of the initially stated type is suggested which is characterized in that at each end or head of the vehicle checking devices, electrical contacts or electronic sensors are provided which when the vehicle is in place trigger Yes/No signals depending on whether or not the individual point of the vehicle being checked corresponds to the correct or undamaged vehicle XYZ-value. The result is evaluated or displayed by an evaluation and/or display arrangement.

With the arrangement according to the invention, the essential advantage is achieved that the signals, supplied by the contacts or sensors as simple Yes/No signals, can be evaluated or displayed in an evaluation and/or display arrangement. Therewith, in simple manner, a determination is immediately possible whether or not the individual points of the body being checked have their normal XYZ-value or position. Any display of choice may be used, or only a simple on-off light display can be utilized, to show the results.

A further development of the arrangement according to the invention is comprised in that at the connecting holes, or aligning bores, and at the plug or aligning pins of the guide supports of the multi-Z-receptors, and the columns of the terminal receptors or head pieces, electrical contacts or electronic sensors are provided which, with additional checking signals, confirm with respect to correct dimension the position of the end points electrically, electronically or mechanically by the act of plugging the plug pins into the aligning bores or holes.

Therewith it is possible to confirm, with a second checking signal electrically, electronically or mechanically produced through the insertion of the plug pin into the aligning bore, the position of the actual vehicle end points with respect to their correct dimension. This is especially advantageous for the reason that with each multi-Z-part, comprised of a tower and a head piece or terminal, a plug pin is used for correctly positioning the head piece in the tower and, thereby, checking the vehicle.

A further embodiment of the arrangement according to the invention is comprised in that the electrical contacts or electronic sensors are electrically connected, via a suitable interface, with the input of a computer having a memory in which the data of the XYZ-values of the predetermined or desired points of an undamaged body are input. In this manner the computer, controlled by a program, carries out a nominal/actual comparison between the data of the input values and those supplied by the contacts of the sensors. The result is displayed in a peripheral device, for example a screen, a printer or the like.

With this arrangement, according to the invention, the essential advantage is achieved that the signals supplied by the contacts or the sensors in the head piece are compared with the data of the XYZ-values stored in the computer. A nominal/actual comparison is thereby achieved which is displayed by a screen or confirmed or noted in writing by a printout. The signals supplied by the electrical contacts or electronic sensors state whether or not the correct value is obtained, thus in each case they provide Yes/No information.

Since the electrical contacts or electronic sensors can also be present in the plug pins and bores, which are activated with axial pinning of the head piece to the tower, an indication of the XYZ-values of the points of a body to be checked is possible.

DESCRIPTION OF THE DRAWINGS

In conjunction with the drawings, with a fundamental representation by example, the arrangement according to the invention is to be explained in greater detail. In the drawing:

FIG. 2 shows a fundamental perspective representation of the alignment bench with the terminal alignment-angle sets and the represented electrical contacts or electrical sensors which are connected with a computer arrangement; and FIG. 3 shows a detail representation of the arrangement of the electrical contacts or electronic sensors on the guide supports connected with the frame.

DESCRIPTION OF A PREFERRED EMBODIMENT

Figure 1:
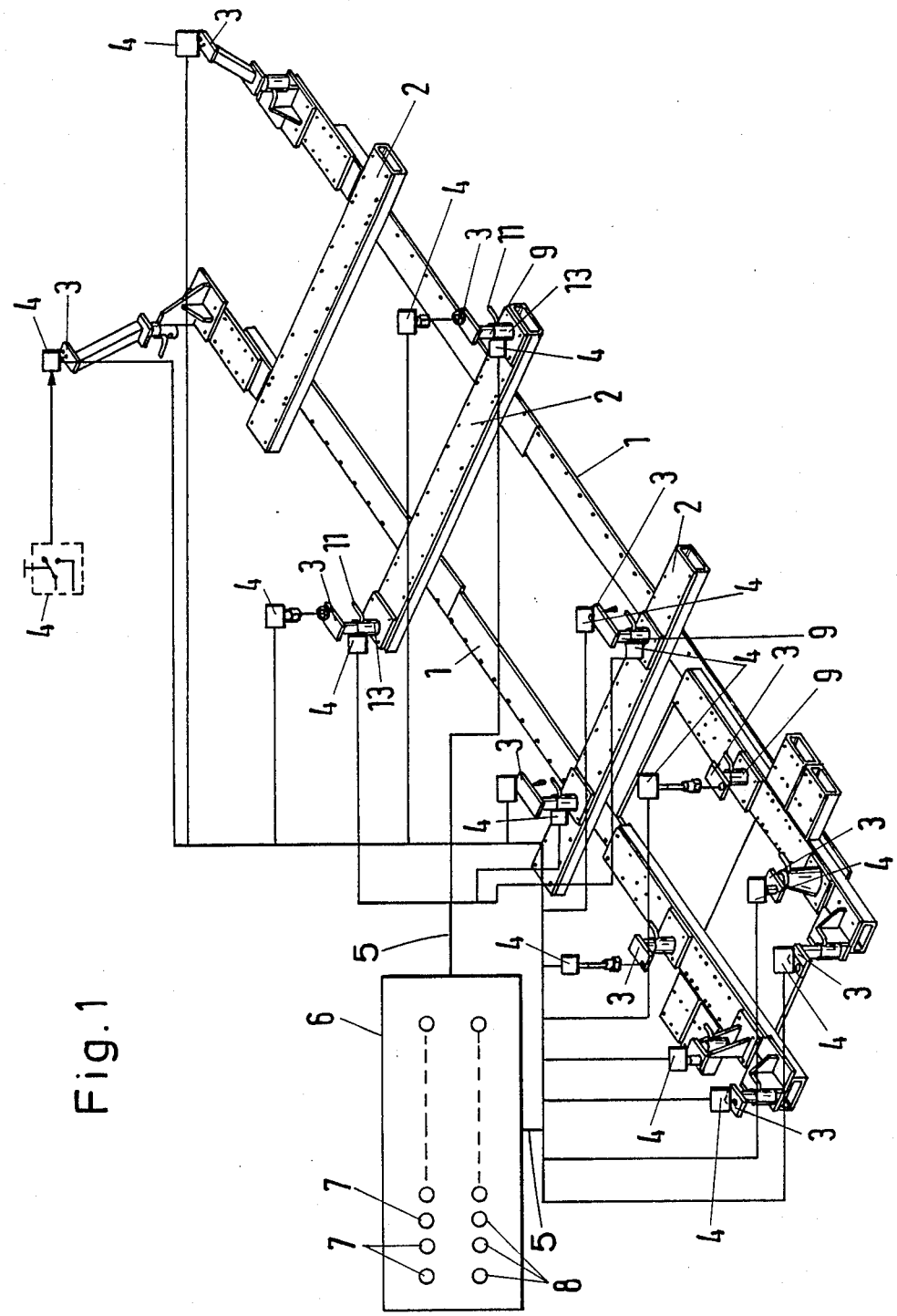
FIG. 1 shows a fundamental perspective representation of the alignment bench with the terminal alignment-angle sets for a particular vehicle and the represented electrical contacts connected with a display device.

As is evident in FIG. 1, the arrangement according to the invention is comprised of a frame constructed of longitudinal or side sections 1 and transversely extending cross pieces 2 each provided on the top side with positioning holes.

On the frame, from the front to the rear, are several arrangements 3 of an alignment-angle set, positioned a distance for a given modular dimension on the transverse and longitudinal supports 1 and 2. The alignment-angle sets 3 comprise mechanical parts, or head pieces, whose shape is adapted to accommodate the points of a vehicle body to be checked. At the ends of these head pieces of elements 3 electrical contacts 4 or electronic sensors are arranged.

The electrical contacts 4 or electronic sensors are coupled with any suitable selected display device 6 such as a Yes/No light panel, via links 5, in which two rows 7 and 8 of lights are disposed which are to display the "Yes" state or the "No" state. When on the alignment bench 1, 2, a complete or partially disassembled vehicle is placed, whose body points are to be checked to determine if they correspond to the standard, i.e. that this is a non-damaged or new body, the entire row 7 of lights which represents the "Yes" state must light up. If at one or at several points the actual position of the vehicle body has deviations present from the desired or non-damaged positional XYZ-co-ordinates, then the corresponding lights of row 8 for the "No" state light up. It is thus immediately possible to determine whether or not the body is damaged.

According to a further embodiment of the invention, there also are provided, as is evident in particular from FIG. 1 in connection with FIG. 3, alignment holes 10 in the rods 9 of the terminal receptors or end head pieces, which are properly positioned by means of a plug pin 11, which can be positioned through holes 12 into a hollow support 13 to position the head piece in the predetermined desired position. For confirmation of the second checking signal in the area of plug pin 11, additional electrical contacts or electronic sensors are provided which are activated on plugging in the plug pin.

As is apparent in FIG. 2, the electrical contacts 4 or electronic sensors are connected to an interface 14 via links 5 The interface 14 is connected to the input of a computer 15 having in its memory the data of the XYZ-values or dimensional coordinates for the points of an undamaged body of the vehicle kind being checked. The computer is controlled through an appropriate program to carry out a nominal/actual comparison between the input data which correspond to the particular points of an undamaged body and the actual values supplied by the contacts or sensors.

The result of this comparison can be displayed on a screen 16 or printed out by a printer 17. In this manner it becomes possible to carry out in relatively short time a complete diagnosis of the points of a motor vehicle body to be checked, to determine if a portion thereof has been damaged or to verify if proper correction or repair has been made, or the value of the deviation from the proper position.

The electrical contacts 4 can also be comprised of normal touching contacts. But it is also possible to provide any desired electronic sensors, for example magnetic, electrostatic or electro-optical sensors which analogously are connected via the links either with the display device 6 or with the interface 14.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In an apparatus for diagnosing the dimensions of a motor vehicle body positioned upon an alignment bench comprising a frame on which are arranged terminal alignment-angle sets comprised of control head end pieces carried by columns which are longitudinally displaceable and fixable to the frame such that the control head pieces function as multi-Z-receptors wherein the control head end pieces are fabricated such that upon positioning upon the frame a desired XYZ-values for a desired dimensional coordinate of the vehicle is located, the improvement comprising sensor means carried by said control head end pieces to trigger either a yes or no signal from the vehicle in response to whether or not the particular point of the vehicle to be checked corresponds to a predetermined dimensional co-ordinate XYZ-value, and display means for displaying said signal (6).

2. The apparatus of claim 1 wherein said control head end pieces and said columns have connecting holes and an alignment pin for engaging said connecting holes such that upon insertion of said pin in said connecting holes a predetermined XYZ positional co-ordinate is established, said sensor means actable upon the positioning of the alignment pin in said connecting holes to provide an additional checking signal.

3. The apparatus of claim 1 wherein said sensor means is electrically coupled by a suitable interface with the input of a computer having a memory into which the data of the desired XYZ dimensional co-ordinates of the specific points of an undamaged body vehicle have been input, such that the computer carries out a nominal/actual comparison between the input data desired and the data supplied by the sensor means to display the comparison in a peripheral device, for example a screen (16), a printer (17) or the like.

4. The apparatus of claim 2 wherein said sensor means is electrically coupled by a suitable interface with the input of a computer having a memory into which the data of the desired XYZ dimensional co-ordinates of the specific points of an undamaged body vehicle have been input, such that the computer carries out a nominal/actual comparison between the input data desired and the data supplied by the sensor means to display the comparison in a peripheral device, for example a screen (16), a printer (17) or the like.

5. The apparatus of claim 1, wherein said sensor means includes electrical contacts which are normal electrical touching contacts.

6. The apparatus of claim 1 wherein said sensor means comprise one of either magnetic, electrostatic or electro-optical sensors.

* * * * *